INVENTOR.
WOUTER SMEULERS
BY
[signature]
AGENT

INVENTOR.
WOUTER SMEULERS
BY
Frank R. Trifari
AGENT

United States Patent Office 3,395,360

Patented July 30, 1968

3,395,360

CIRCUIT FOR COMBINED DIRECT AND INDIRECT SYNCHRONIZATION OF AN OSCILLATOR

Wouter Smeulers, Emmasingel, Eindhoven, Netherlands, assignor to North American Philips Co., Inc., New York, N.Y., a corporation of Delaware Filed Dec. 20, 1966, Ser. No. 603,385
Claims priority, application Netherlands, Dec. 24, 1965, 6516878
6 Claims. (Cl. 331—8)

ABSTRACT OF THE DISCLOSURE

An oscillator synchronization circuit in which a phase discriminator has a load circuit comprised of a series load resistor and a filter, reference oscillations and synchronizing signals are applied to the discriminator. Indirect synchronizing signals are obtained from the filter, and direct oscillator synchronizing pulses are obtained from the load resistor. The filter has a time constant that is long with respect to the oscillator frequency, and short with respect to the pulses in a non-synchronous state, so that the amplitude of the direct synchronizing pulses is attenuated in the synchronous state of the circuit.

This invention relates to circuit arrangements for synchronizing an oscillator, comprising a supply voltage source and the series-combination of a smoothing network, a load resistor and a phase discriminator, which series-combination is connected between the terminals of the supply voltage source, the phase discriminator including at least one amplifying element and having fed to it synchronizing pulses and a reference signal derived from the oscillator, while the pulses developed across the load resistor are fed to the oscillator for direct synchronization and the direct voltage developed across the smoothing network in a state of synchronization being fed as a control voltage to the oscillator for indirect synchronization.

Such an arrangement is known from U.S. Patent No. 3,070,753, in particular FIGURE 10. In this known arrangement also the synchronizing pulses for the direct synchronization of the oscillator are derived from the phase discriminator which provides also the control voltage for the indirect synchronization of the oscillator. However, this known circuit arrangement employs a separate attenuator for attenuating the synchronizing pulses used for the direct synchronization in a state of synchronization and a second phase discriminator is required for control of the said attenuator. An object of the present invention is to bring about the attenuation of the synchronizing pulses in a state of synchronization without the use of all of these additional parts.

According to the invention the values for the load resistor, for the supply voltage and for the control resulting from the signals fed to the phase discriminator are chosen to be such that the amplifying element is controlled to its limit characteristic in substantially any conditions, the time constant of the smoothing network being long relative to the period of the synchronizing pulses and being of the same order of magnitude or short relative to the duration of the beat signal developed across the load resistor in a state of non-synchronization.

Figure 1:
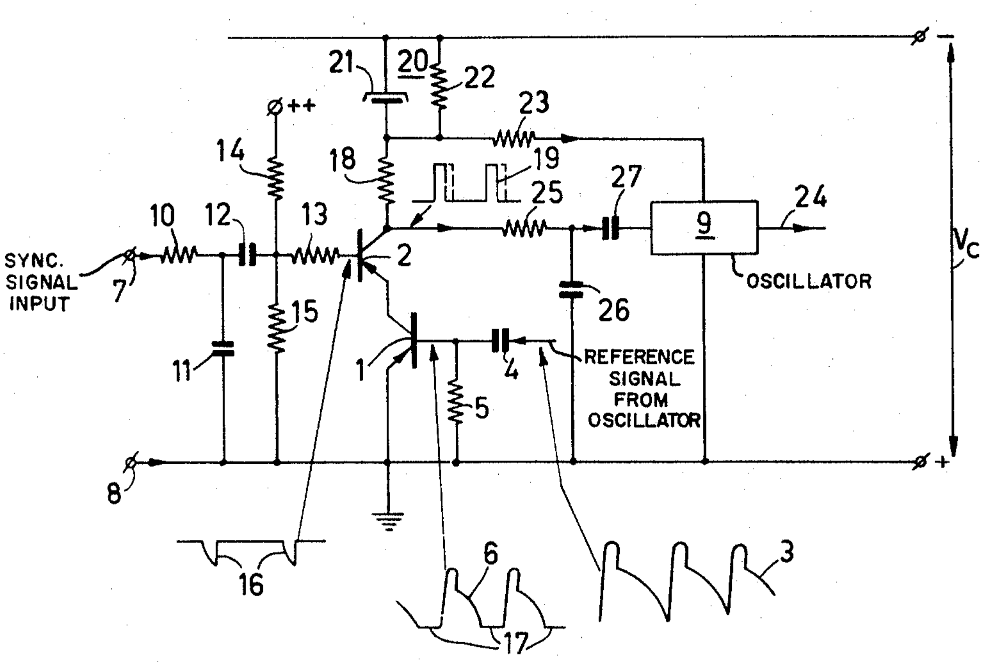
Figure 2:
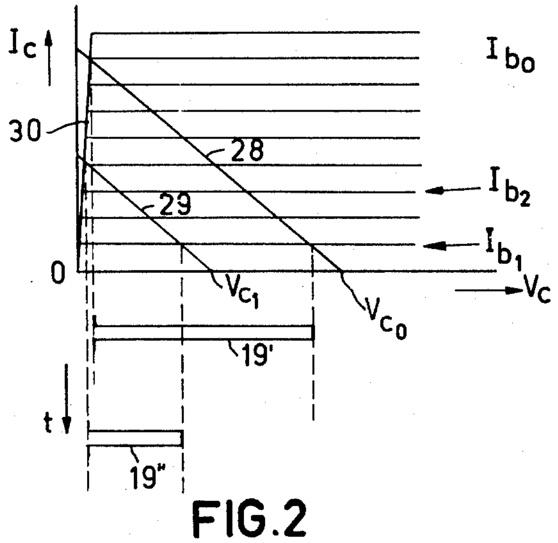

In order that the invention may be readily carried into effect, it will now be described in detail, by way of example, with reference to the accompanying drawings, in which:

FIGURE 1 shows one fundamental embodiment of a phase discriminator according to the invention;

FIGURE 2 serves to explain the embodiment of FIGURE 1, and

Figure 3:
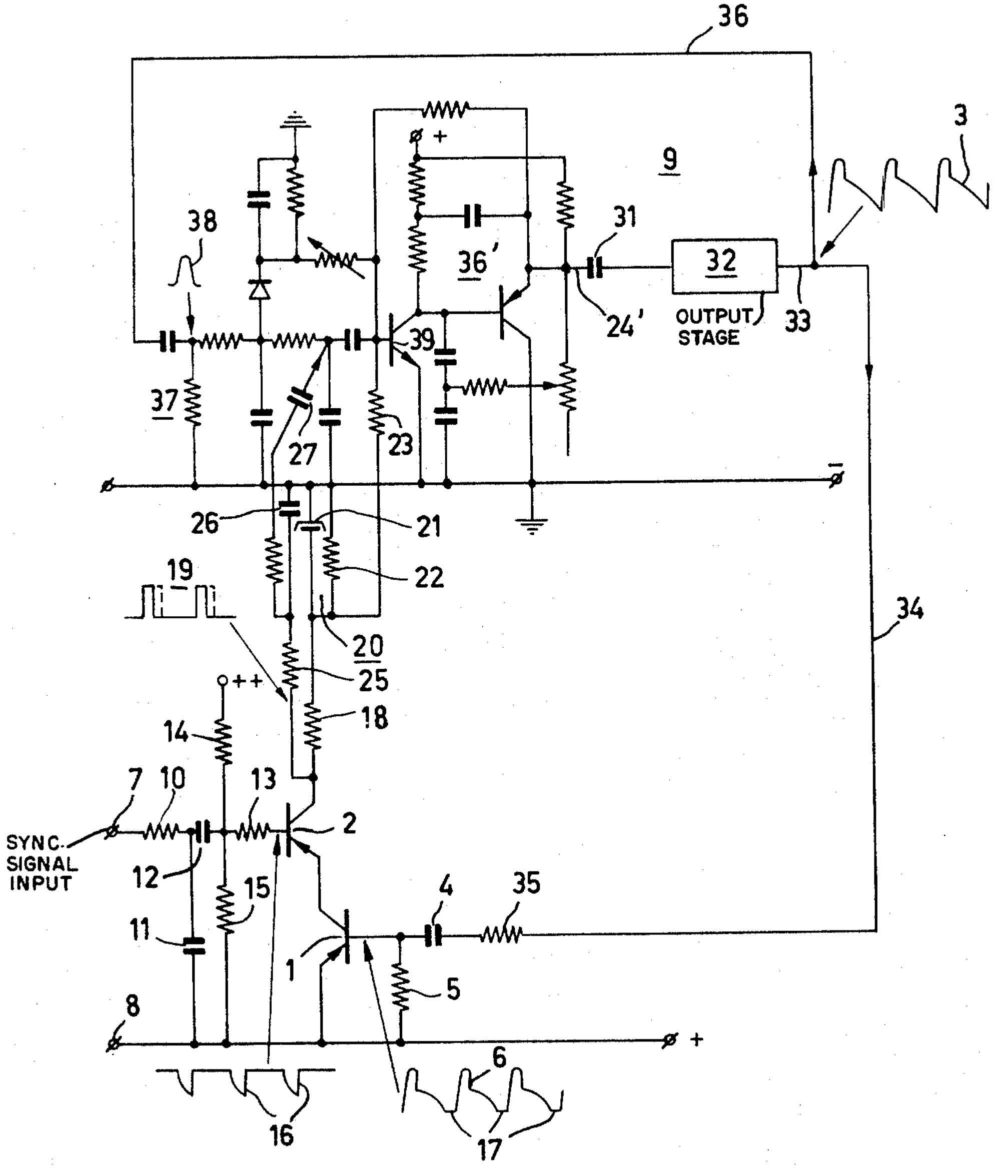

FIGURE 3 shows a more detailed embodiment of the circuit arrangement of FIGURE 1.

Referring to FIGURE 1, transistors 1 and 2 connected in series form parts of the phase discriminator. A reference signal 3 derived from the signal of the oscillator is fed to transistor 1 through a capacitor 4 and a resistor 5. Due to the base current which flows through transistor 1, peaks of the reference signal 3 will be flattened so that a signal as shown at 6 will ultimately be active at the base of transistor 1.

The television synchronizing signal proper is applied to terminals 7 and 8. In the embodiment of FIGURE 1 the phase discriminator is intended for synchronization of a field oscillator 9 in a television receiver. To separate the field synchronizing pulses required for synchronizing the oscillator 9 from the total television synchronizing signal, this signal is fed through the terminals 7 and 8 to an integrating network comprising a resistor 10 and a capacitor 11. The integrated field synchronizing pulses are fed through a coupling capacitor 12 and a series-resistor 13 to the base of transistor 2. The voltage divider comprising resistors 14 and 15 serves only to adjust the correct bias voltage of transistor 2.

Pulses 16 from the field synchronizing signal which is active at the base of transistor 2 coincide in part with flattened portions 17 of the reference signal 6. Since, in addition, transistor 2 cuts sections out of the signal 16, pulses 19 will appear across a load resistor 18 in the collector circuit of transistor 2 which pulses have a duration dependent upon the extent to which the field pulses 16 coincide with the flat portions 17. That is to say the pulses 19 have a variable duration which depends upon the phase difference between the field synchronizing signal and the signal from the oscillator.

The collector circuit of transistor 2 also includes a smoothing network 20 which comprises a capacitor 21 and a resistor 22. The network 20 has a time constant which is long relative to the period of the field synchronizing pulses. However, this time constant is of the same order of magnitude as the beat signal which occurs in a state of non-synchronization. As is well known, the frequency of the field synchronizing signal in a state of synchronization is equal to the frequency of the signal from the oscillator. Consequently, the pulses 19 in a state of synchronization will have a period which is equal to that of the field synchronizing signal. Since the time constant of network 20 is long relative to the period of the synchronizing signal, this implies that the pulses 19 charge the capacitor 21, which can hardly discharge during the interval between two pulses due to the long time constant. That is to say a direct voltage is developed across the capacitor 21 which is equal to the mean value of signal 19. Since, as mentioned hereinbefore, the duration of the pulses 19 depends upon the phase difference between the signals 6 and 16, it will be evident that, in a state of synchronization, a direct voltage is developed across the network 20 which depends upon the phase difference between the signals 6 and 16. This phase difference in turn depends upon the initial frequency difference between the field synchronizing signal 16 and the natural frequency of the oscillator 9, which natural frequency is the frequency of the signal from the oscillator in a state of non-synchronization. The direct voltage developed across the network 20 is fed through a resistor 23 for indirect synchronization to the oscillator 9 from which the control signal for the field output stage may be derived via its output terminal 4.

However, the pulses 19 developed across resistor 18 will also be fed for direct synchronization to the oscillator 9, but since a phase difference must be ensured between the synchronizing signal and the signal from the oscillator it is necessary that the substantially right-angled pulses 19 are first integrated by means of a resistor 25 and a capacitor 26, whereupon the integrated pulses are fed to the oscillator 9 through a coupling capacitor 27.

However, as has been disclosed in U.S. Patent No. 3,070,753, it is desirable that the pulses 19 should be greatly attenuated in a state of synchronization. This is because not only the pulses 19 required for synchronization are attenuated but also any interference pulses still coming through which may detrimentally affect the direct synchronization. Since, furthermore, in a state of synchronization the frequency of the oscillator signal has been made substantially equal to the frequency of the field synchronizing signal by the indirect synchronization, a comparatively small amplitude for the pulses 19 is sufficient. The co-action between the phase discriminator and the direct synchronization further depends upon the amplitude of the integrated field-synchronizing pulses. In fact, the greater the amplitude of the integrated field synchronizing pulses, the smaller the phase difference between the signal from the oscillator and the field pulses (this phenomenon has been described in detail in the said U.S. Patent No. 3,070,753). This involves the disadvantage that, in otherwise unvaried conditions, the phase discriminator will provide a control voltage which is lower than that in the case where said phase difference was greater. Furthermore the adjustment of the phase discriminator is more critical and its sensitivity to interference is higher. Said phase difference increases with decreasing amplitude of the pulses 19 so that a comparatively small amplitude is not only sufficient but also desirable.

However, in a state of non-synchronization, a large frequency difference may exist between the field synchronizing signal 16 and the signal from the oscillator. It is then necessary to work with a great amplitude for the pulses 19 since such great pulses permit catching of the oscillator. The term "catching" is to be understood to mean that the direct synchronization sets the oscillator into synchronization with the field synchronizing signal. The greater the amplitude of the pulses 19, the larger the frequency difference between the signal from the oscillator and the synchronizing signal which is still permissible to permit catching. By means of particular proportioning of the arrangement of FIGURE 1 it is possible to ensure that the pulses 19 have a small amplitude in a state of synchronization and a great amplitude in a state of non-synchronization.

As previously mentioned, the network 20 has a time constant which is either of the same order of magnitude or short relative to a period of the beat signal which appears across resistor 18 in a state of non-synchronization. In fact, in such a state of non-synchronization, not every pulse 16 from the field synchronizing signal will coincide with a flat portion 17 of the reference signal 6. On the contrary, in a state of non-synchronization, a field pulse 16 will coincide with a flat portion 17 only with certain intervals. Only during coincidence can a current flow through resistor 18, in other words the current flowing through resistor 18 has a frequency which is equal to the difference in frequency between the signals 6 and 16, or in other words this signal is a beat signal and thus has a beat frequency. This beat frequency is very low. Since the duration of the pulses of signal 19 will neither substantially have varied in the beat signal, this means that the mean value of the beat signal is much lower than that of the signal 19 for a state of synchronization. Consequently, the voltage across the network 20 in a state of non-synchronization will be a manifold lower than that in a state of synchronization. Thus, for example, in a given embodiment the voltage across network 20 in a state of synchronization is 5 volts for a supply voltage $V_c$ of 10 volts. The voltage of 5 volts across network 20 varies as a function of the phase difference between the signals 6 and 16, between approximately 4.5 volts and 5.5 volts. In a state of non-synchronization, however, the voltage across network 20 is only ⅕ volt, which means that this voltage is substantially negligible relative to the aforementioned 5 volts.

The foregoing implies that the voltage which is active at that end of collector resistor 18 which is connected to network 20 varies from approximately 10 volts to approximately 5 volts relative to earth.

The significance thereof will be explained in detail with reference to FIGURE 2 which shows the $I_c$-$V_c$ characteristic of transistor 2. In this characteristic it has been assumed that at the instants of the occurrence of the flat portions 17, the transistor 1 is controlled substantially into its state of saturation so that the voltage drop across it is negligible during these periods. Consequently it suffices to consider transistor 2 only. Should the said voltage drop not be negligible, it is necessary to subtract it from the total voltage active between the junction point of resistor 18 and capacitor 21, and earth, whereafter the whole consideration is true again of transistor 2 alone. In FIGURE 2 the voltage $V_{c0}$ is the voltage at the aforementioned end of resistor 18 for a state of non-synchronization. Thus in the said embodiment $V_{c0}=10$ volts. However, the voltage $V_{c1}$ is the voltage at the said end of resistor 18 for a state of synchronization. For the said embodiment $V_{c1}=5$ volts. The load formed by resistor 18 is represented in FIGURE 2 by line 28 in a state of non-synchronization and by line 29 in a state of synchronization. Further, the drive of transistor 2 resulting from the applied field pulses 16 and the reference signal 6 amplified in transistor 1, is such that transistor 2 is controlled between the curves $I_{b1}$ and $I_{b0}$. Consideration of FIGURE 2 shows that by the said method of control and by the choice of resistor 18 it will always be ensured that transistor 2 is controlled into its limit characteristic 30 independently of the active supply voltage. That is to say transistor 2 is always controlled into its saturation range in both the state of non-synchronization and the state of synchronization. However, since the load line 28 is active in a state of non-synchronization, a pulse 19' will be developed which has a much greater amplitude than pulse 19'' which occurs across resistor 18 in a state of synchronization since in this case the load line 29 is traversed. This is because the apparent supply voltage for transistor 2 shifts from the value $V_{c0}$ to the value $V_{c1}$ due to the varying voltage at the said end of resistor 18. From FIGURE 2 it may be seen that the difference in amplitude between the pulses 19' and 19'' is considerable. This difference may even be accentuated by controlling, for example, between the values $I_{b2}$ and $I_{b0}$ instead of between the values $I_{b1}$ and $I_{b0}$. Although the amplitude of the pulse which occurs in a state of non-synchronization is thus reduced, the amplitude of the pulse which occurs in a state of synchronization decreases to a comparatively greater extent. It may thus be achieved that the difference between the pulses 19' and 19'' is even greater than with a complete control between the values $I_{b1}$ and $I_{b0}$ as shown in FIGURE 2. This may alternatively be achieved by making the ratio between the resistors 18 and 22 lower than has been assumed for FIGURE 2. It is thus possible to obtain a mean value from 8 to 9 volts at the same supply voltage $V_c=10$ volts for the control voltage which occurs across network 20 in a state of synchronization. The load line 29 in FIGURE 2 will thus shift further to the left, so that an even smaller amplitude for the pulses 19'' may be obtained.

Although in the emboidiment of FIGURE 1 the oscillator 9 has been assumed to be the field oscillator, it will be evident that the system shown in FIGURE 1 is also usable if the oscillator 9 is the line oscillator. In this case the oscillator 9 may alternatively be a sine oscillator since such a type of oscillator also lends itself to direct and indirect synchronization. However, the indirect synchronization through resistor 23 will then play a greater part and the direct synchronization by means of the pulses 19 will play a smaller part. In this case steps may be taken that the attenuation of the pulses 19 is considerable. It is then neither necessary for the reference signal fed through capacitor 4 to have a waveform as shown for the reference signal 3 in FIGURE 1. The signal fed through capacitor 4 may be a purely pulsed signal which coincides or not with the pulses fed to the base of transistor 2. It is neither strictly necessary always to use two transistors 1 and 2 connected in series. By adding the reference and synchronizing signals through two resistors it is also possible to feed this summated signal directly to the base of transistor 2, the transistor 1 then being dispensed with and the emitter of transistor 2 being directly connected to earth.

The principle according to the invention is applicable as well when using tubes instead of transistors. If, for example, the transistors 1 and 2 are replaced by a pentode, the pulses 16 being fed to the suppressor grid and the signal 6 to the first control-grid thereof, the principle according to the invention is completely retained provided that it is ensured that such a pentode is also controlled into its limit characteristic. For a pentode also an $I_a$-$V_a$ characteristic may be drawn which corresponds substantially to the $I_c$-$V_c$ characteristic of FIGURE 2, except that the value of the voltage $V_c$ at which the limit characteristic is reached can lie at approximately ⅕ volt for a transistor, whereas for pentodes this value may be comprised between 30 volts and 50 volts, dependent upon the type of pentode used.

FIGURE 3 shows a more detailed embodiment of a circuit arrangement according to the invention in which corresponding parts are indicated as far as possible by the same reference numerals as in FIGURE 1.

In the circuit arrangement of FIGURE 3 the oscillator 9 is a relaxation oscillator of the so-called self-oscillating type. To this end, a signal from a terminal 24' is fed through a capacitor 31 to an output stage 32 from which the reference signal 3 may be derived via its terminal 33. The reference signal 3 is fed, on the one hand, to capacitor 4 through a lead 34 and a series-resistor 35 and, on the other, to the input of a booster stage 36' through a lead 36. Pulses 38 are derived from the reference signal 3 by means of a capacitor-resistor network 37 and cause a transistor 39 in the booster stage 36 to be periodically made conducting. The base of transistor 39 has applied to it, on the one hand, through resistor 23 the control voltage from a smoothing network 20 which is required for the indirect synchronization and, on the other hand, through capacitor 27 the integrated pulses 19 required for the direct synchronization. The circuit arrangement of FIGURE 3 otherwise operates similarly to that of FIGURE 1, it being fundamentally immaterial that, in contrast with the circuit arrangement of FIGURE 1, the minus terminal of the supply voltage source for the phase discriminator is now connected to earth.

In one particular embodiment in which the oscillator 9 fulfils the function of a field oscillator in a television receiver including a display tube having a screen of 28 cms. in cross-section and the deflection angle of which is approximately 90°, the resistor 18 is approximately 330 ohms and the time constant of the network 20 is approximately 1.5 sec. The supply voltage $V_c$ is 10 volts and resistor 22 is 56 kohms.

What is claimed is:

1. A circuit arrangement for synchronizing an oscillator, comprising a supply voltage source and the series-combination of a smoothing network, a load resistor and a phase discriminator, which series-combination is connected between the terminals of the supply voltage source, the phase discriminator including at least one amplifying element and having fed to it synchronizing pulses and a reference signal derived from the oscillator, while the pulses developed across the load resistor are fed to the oscillator for direct synchronization and the direct voltage developed across the smoothing network in a state of synchronization being fed as a control voltage to the oscillator for indirect synchonization, characterized in that the values for the load resistor, for the supply voltage and for the control resulting from the signals fed to the phase discriminator are chosen to be such that the amplifying element is controlled to its limit characteristic in substantially any conditions, the time constant of the smoothing network being long relative to the period of the synchronizing pulses and being of the same order of magnitude or short relative to the duration of the beat signal developed across the load resistor in a state of non-synchronization.

2. A circuit arrangement as claimed in claim 1, in which the oscillator is a relaxation oscillator providing a control signal for the field output stage in a television receiver, characterized in that the phase discriminator includes two transistors connected in series, the reference signal being fed to the base of the first transistor and the field synchronizing signal from an incoming television signal being fed to the base of the second transistor, and the collector circuit of the second transistor including a load resistor of 330 ohms, and the smoothing network which has a time constant of approximately 1.5 sec., the supply voltage being approximately 10 volts.

3. A synchronizing circuit for an oscillator comprising an oscillator, a source of synchronizing signals, means for deriving a reference oscillation from said oscillator, a source of supply voltage having first and second terminals, a series circuit of amplifier device means, load resistor means and a filter network connected serially between said first and second terminals, means applying said synchronizing signals and reference oscillations to said amplifier device means whereby a pulsatory current having pulse widths dependent upon the phase difference between said synchronizing signals and oscillations flows through said series circuit, means applying the voltage drop across said filter network to said oscillator for indirect synchronization thereof, and means applying the pulsatory voltage developed across said load resistor means as a result of said pulsatory current to said oscillator for direct synchronization thereof, said filter network having a long time constant with respect to the period of said reference oscillations and a time constant that is substantially at least as short as beat signals in said pulsatory current developed when said reference oscillations are not synchronized with said synchronizing signals, whereby said pulsatory voltage is attenuated when said reference oscillations are synchronized with said synchronizing signals.

4. The synchronizing circuit of claim 3 wherein said amplifier device means comprises first and second transistors, means serially connecting the emitter-collector paths of said first and second transistors, means applying said reference oscillations to the base of said first transistor with an amplitude and polarity to saturate said first transistor, and means for applying said synchronizing signals to the base of said second transistor.

5. The synchronizing circuit of claim 3 in which said filter network comprises a parallel circuit of a resistor and a capacitor.

6. The circuit of claim 3 in which said means applying said pulsatory voltage to said oscillator comprises integrating circuit means.

References Cited

UNITED STATES PATENTS 3,070,753 12/1962 Smeulers ---------- 331—10 X

ROY LAKE, *Primary Examiner.*

S. H. GRIMM, *Assistant Examiner.*